US005869167A

United States Patent [19]

Takeuchi et al.

[11] Patent Number: 5,869,167

[45] Date of Patent: Feb. 9, 1999

[54] ELECTROPHOTOGRAPHIC DECALCOMANIA TRANSFER MEDIUM

[75] Inventors: Tatsuo Takeuchi, Kawasaki; Motohiro Ogura, Machida, both of Japan

[73] Assignee: Canon Kabushiki Kaisha, Tokyo, Japan

[21] Appl. No.: 718,234

[22] Filed: Sep. 20, 1996

[30] Foreign Application Priority Data

Sep. 22, 1995 [JP] Japan .................................... 7-244054
Sep. 22, 1995 [JP] Japan .................................... 7-244055

[51] Int. Cl.$^6$ ........................................................ B32B 3/00

[52] U.S. Cl. ................... 428/195; 428/411.1; 428/474.4; 428/480; 428/488.4; 428/913; 430/47

[58] Field of Search .......................... 428/195, 76, 474.4, 428/480, 411.1, 488.4, 500, 913; 430/47

[56] References Cited

U.S. PATENT DOCUMENTS 5,302,438 4/1994 Komamura et al. .................... 428/195

FOREIGN PATENT DOCUMENTS 4-361086 12/1992 Japan .

*Primary Examiner*—Elizabeth Evans
*Attorney, Agent, or Firm*—Fitzpatrick, Cella, Harper & Scinto

[57] ABSTRACT

An electrophotographic decalcomania transfer medium comprising a polymer resin film formed on the surface side of a base material essentially consisting of paper, in which the polymer resin film on the surface side comprises an adhesion layer and a transfer layer, and the back side of the base material is provided with a backing layer comprising a polymer resin. The backing layer is formed such that it partially covers the surface of the base material, instead of covering the entire surface thereof.

17 Claims, 3 Drawing Sheets

ELECTROPHOTOGRAPHIC DECALCOMANIA TRANSFER MEDIUM

FIELD OF THE INVENTION

The present invention relates to an electrophotographic decalcomania transfer medium, from which a toner image obtained thereon can be retransferred to another final transfer medium in an apparatus, such as an electrophotographic apparatus and an electrostatic recording apparatus, forming images by using toner.

DESCRIPTION OF THE RELATED ART

Conventionally, decalcomania is widely known as a technique for three-demensionally transferring images. A method of transferring images by water pressure is known as an example of decalcomania and it proceeds as follows: a base material, such as paper, is coated with a water-soluble paste, such as dextrin; the required image is formed from acrylic ink by screen printing, etc.; the coated dextrin is dissolved by immersing the paper in water; and the acrylic-ink image floating in water is transferred to a three-dimensional object, such as earthenware, by water pressure. It is also known that the transfer paper used for the foregoing method can be directly applied to electrophotography. In this case, a transfer medium is prepared by forming a dextrin film on rice paper, and a toner image is formed on the surface of the dextrin film by an electrophotographic apparatus. Then, the transfer medium is passed through an organic solvent for softening the resin contained in the toner so that the toner image is allowed to adhere to a retransfer medium, and is arranged to be in close contact with the retransfer medium such that the correct image is put thereon. After that, water is added to the back side of the transfer medium so as to dissolve the dextrin film for transferring only the toner image to the retransfer medium.

However, according to the foregoing transfer medium obtained by forming a water-soluble coating film on opaque paper, a large amount of expansion or shrinkage readily occurs because of the high sensitivity to the moisture contained in the atmosphere. Disadvantageous curling is thereby caused and seriously impairs paper running in the apparatus.

Japanese Patent Laid-Open No. 4-361086 discloses a retransfer medium using, instead of dextrin, a polyvinyl alcohol which is a saponified compound of vinyl acetate. The retransfer medium is obtained such that an acrylic resin film is formed on paper coated with a silicone resin, and a polyvinyl alcohol containing a silicone antifroth agent is further applied thereon. After forming a toner image on the coating film by an electrophotographic apparatus, the polyvinyl alcohol film is peeled from the base material and put on the retransfer medium for retransferring such that the correct image is in contact therewith.

For allowing the toner image to adhere to the retransfer medium, the resin contained in the image is softened by heating and pressing. After cooling, an 80% ethyl alcohol aqueous solution is added to the back side of the polyvinyl alcohol film so that the adhesion between the film and the toner image decreases to finish retransferring.

According to the foregoing method, since the film which holds a toner image thereon and which is peeled from a base material is transparent, it becomes easier to correctly position the image to an object.

However, since the polyvinyl alcohol used for the foregoing method contains partially saponified vinyl acetate, the resultant transfer medium is sensitive to the moisture in the atmosphere and readily occurs curling, as is similar to those using dextrin.

SUMMARY OF THE INVENTION

Accordingly, it is an object of the present invention to provide an electrophotographic decalcomania transfer medium which exhibits small curling and excellent paper running in an electrophotographic apparatus.

Further, another object of the present invention is to provide an electrophotographic decalcomania transfer medium which exhibits excellent water-proofing.

Furthermore, still another object of the present invention is to provide an electrophotographic decalcomania transfer medium which does not form blisters even if the transfer medium is in contact with an overheated portion inside an electrophotographic apparatus.

The present invention is an electrophotographic decalcomania transfer medium comprising a polymer resin film formed on the surface side of a base material essentially consisting of paper, in which the polymer resin film on the surface side comprises an adhesion layer and a transfer layer, and the back side of the base material is provided with a backing layer comprising a polymer resin.

According to an electrophotographic decalcomania transfer medium of the present invention, both sides of paper, which is used as a base material of the electrophotographic decalcomania transfer medium, are resin-coated. The resin coating layer provided on one side of the paper is used as an adhesion layer, and a transfer layer is formed thereon. The resin coating layer on the other side is used as a backing layer for decreasing curling which is caused by leaving the transfer medium at a low humidity. The resultant electrophotographic decalcomania transfer medium can thereby achieve further stable paper running. In addition, the backing layer is formed such that it partially covers the surface of the base material, instead of covering the entire surface thereof. Thus, even if contact occurs between an overheated portion of an electrophotographic apparatus and the transfer medium, the moisture contained in the base material is allowed to evaporate from the surface of the base material which is not covered with the backing layer. It becomes thereby possible to avoid blisters formed at heat-fused portions.

DESCRIPTION OF THE PREFERRED EMBODIMENT

The present invention will be better understood from the following embodiments taken in conjunction with the accompanying drawings.

Figure 1:
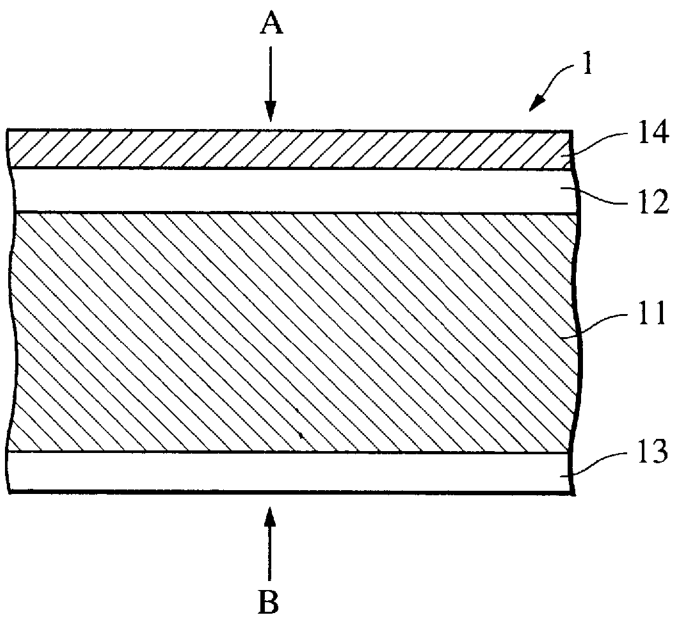
FIG. 1 is a diagrammatic sectional view showing a decalcomania transfer medium of the present invention.

FIG. 1 is a diagrammatic sectional view showing a layer structure of an electrophotographic decalcomania transfer medium 1 of the present invention. As a base material 11 of the transfer medium 1, the following paper is used: plain paper having a high or moderate quality; and so-called coated paper or art paper obtained by coating one or both surface sides of the foregoing plain paper for fitting. The preferable paper weighing is 30 $g/m^2$ or more and, more preferably, 45 $g/m^2$ or more. When the weighing is less than 30 $g/m^2$, reliably paper running is impaired in an electrophotographic apparatus, even if the paper has a thick resin coating film. Further, the preferable paper weighing is 200 $g/m^2$ or less and, more preferably, 150 $g/m^2$ or less. If the weighing is more than 200 $g/m^2$, paper running readily deteriorates because of exceedingly high rigidity of base paper. For maintaining excellent image transferring in an electrophotographic apparatus, preferably, base paper contains 0.2 to 4% by weight of an inorganic salt, such as sodium chloride, and is adjusted to exhibit a volume resistance of $10^8$ to $10^{10}$ Ω.cm after being left for 24 hours at 20° C. and 65% RH.

An adhesion layer 12 is provided for preventing a transfer layer 14, which will be later coated thereon, or both a separating layer 15 and a transfer layer 14 in the case of FIG. 2 described below, from readily peeling in an electrophotographic apparatus. An acrylic resin, polyester resin, or nylon (polyamide) resin is preferably used for forming the adhesion layer 12. Examples of these are an aqueous acrylic emulsion resin, a water-soluble acrylic resin, a water-soluble polyester resin, a 6.6 nylon resin, a polyacrylonitrile resin and an acrylic resin soluble to organic solvents. In addition, oil-absorbable amorphous silicon dioxide, i.e., so-called silica fine powder, may be mixed therewith, if required. The silica fine powder is used for improving the adhesion to the upper layer and, further, for absorbing the moisture which evaporates from the inside of coated paper. The particle size thereof is preferably from 0.5 to 10 μm.

When selecting materials for the transfer layer 14 and the adhesion layer 12, it is necessary to consider the adhesive strength therebetween, which is evaluated as a strength required for peeling the transfer layer 14 in the direction of 90° to the base material 11 fixed on a flat plate with adhesive means, such as an adhesive tape having adhesive coating on both surfaces thereof. The adhesive strength is preferably 4 g/cm or less to prevent the transfer layer 14 from tearing when the layer is peeled from the base material 11, and is preferably 1.5 g/cm or more to avoid peeling due to a carriage force in the electrophotographic apparatus. It is preferable to add a small amount of an organic silicone compound to the transfer layer 14 so as to fulfil the foregoing requirements.

The transfer layer 14 is required to receive a toner image from the electrophotographic apparatus, retain the image at least until retransferring is started by heating, allow the toner image to readily separate therefrom for retransferring, and exhibit satisfactory water-proofing. In other words, it is necessary to have excellent water proofing while maintaining the solvent permeability for retransferring. Practically, the transfer layer 14 preferably contains water-soluble polymer and, more preferably, the water-soluble polymer is a polyvinyl alcohol. Examples of the preferable composition for the transfer layer 14 are described below: A polyvinyl alcohol obtained by saponifying 90% or less of polyvinyl acetate is mixed with a polyvinyl alcohol obtained by saponifying 95% or more of polyvinyl acetate so as to prepare the transfer layer 14. Concerning the mixing ratio indicated as a ratio of the solid contents, that of the high saponified, i.e., 95% or more saponified, polyvinyl alcohol is preferably 10% by weight or more and, more preferably, 25% by weight or more. If the content is less than 10% by weight, the resultant layer becomes exceedingly water-soluble due to the characteristics of the low saponified, i.e., 90% or less saponified, polyvinyl alcohol. As a result, the surface of the transfer layer 14 melts at a high temperature, and members inside the electrophotographic apparatus may be thereby contaminated. When the high saponified polyvinyl alcohol content is 75% by weight or more, straight chain polymers composing the layer per se are arranged in a regular manner similar to a cellulose film, etc. Thus, the shrinkage of the layer may increase corresponding to changes in the moisture of the atmosphere. In other words, the particularly preferable solid content of the high saponified polyvinyl alcohol is 25% by weight or more and less than 75% by weight. Furthermore, for improving the electrophotographic transferring, a cationic or nonionic antistatic agent may be added to the transfer layer 14, if required. The amount of an antistatic agent is determined such that the target surface resistivity of $10^8$ to $10^{12}$ Ω/□ is achieved. Moreover, an inorganic white pigment, such as silica powder, may be mixed therewith for ensuring reliable paper running. Further, 0.5 to 7% by weight of an organic silicone compound is preferably added thereto for obtaining sufficient peeling properties. If the organic silicone content is less than 0.5% by weight, tearing readily occurs because of exceedingly high adhesion strength. Meanwhile, when the content exceeds 7% by weight, the primary fixation of toner is impaired.

To avoid peeling or tearing, the thickness of the adhesion layer 12 is preferably small, i.e., from 2 to 10 μm, both including. If the thickness is less than 2 μm, uniform coating is not readily achieved. Meanwhile, when the thickness exceeds 10 μm, peeling readily occurs within the layer. However, if silica powder is added to the adhesion layer 12, the strength of the layer increases, thus no problem occurs even if the thickness thereof is 15 μm.

The preferable thickness of the transfer layer 14 is 8 μm or more; and it decreased to 3 μm or more when a separating layer is employed for the transfer medium. If the thickness is less than these values, problems, such as tearing of the transfer layer 14 peeled from the base material 11, readily occurs because of a shortage of the film strength. Further, the thickness is preferably less than 50 μm. If the thickness is more than this value, the peeled film becomes hard so that it can hardly fit an curved surface at the time of retransferring. Therefore, the particularly preferable thickness of the transfer layer 14 is from 10 to 40 μm, both including.

Figure 4:
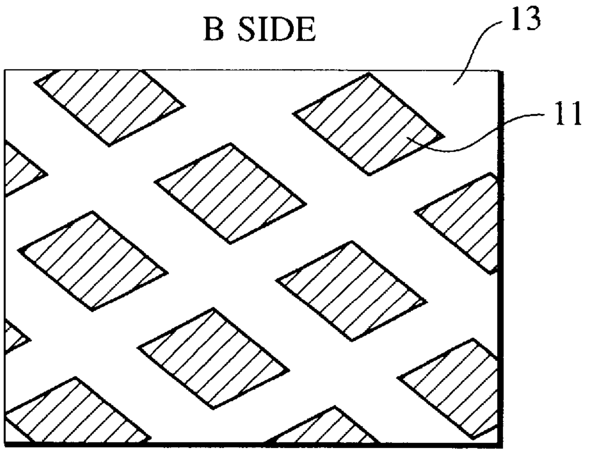
FIG. 4 is a diagrammatic view showing a backing layer of a decalcomania transfer medium of the present invention.

Since the transfer layer 14 is composed of a water-soluble polymer, curling occurs due to expansion or shrinkage thereof according to the conditions in which the transfer medium is left. The backing layer 13 is provided for decreasing the curling and preferably composed of an acrylic resin, a polyester resin or a nylon resin. Both of thermoplastic and thermosetting resins soluble in organic solvents may be used. Examples of these are polyester, urethane, phenol, acrylic, epoxy, butyral, and polyvinyl chloride resins and a mixture thereof. The backing layer 13 can be uniformly formed over the base material 11. However, in an electrophotographic apparatus, overheating readily results from continuous toner image formation on a transfer medium. Thus, if contact occurs between an overheated portion and the transfer medium 1, blisters are formed on the transfer medium 1 because of the evaporation of the moisture contained in the base material 11. For preventing the above phenomenon, it is advantageous to form the backing layer 13 to be partially exposed on the surface of the base material 11, instead of being exposed on the entire surface thereof. FIG. 4 shows an example of the backing layer 13 prepared according to the foregoing manner. The B side of the base material 11 is not completely covered with the backing layer 13 which is formed in the shape of a network. In other words, if the B side of the base material 11 is completely coated with a resin, the moisture contained in the base material 11 abruptly evaporates and causes blisters when the transfer medium 1 is heated by a heat fuser of an electrophotographic apparatus. For preventing this phenomenon, openings are formed on the back side of the transfer medium 1. The preferable opening rate indicated by the covering rate of the backing layer 13 to the base material 11 is 20% to 90%, both including, and, more preferably, 25 to 80%, both including. Each of the openings is required to have an area of 0.01 to 25 $mm^2$, both including. If the area exceeds 25 $mm^2$, curling cannot satisfactorily prevented. Meanwhile, when the area is less than 0.01 $mm^2$, it becomes impossible to smoothly release the moisture evaporating from the base material 11.

The preferable thickness of the backing layer 13 is from 1 to 20 $\mu$m. If the thickness is less than 1 $\mu$m, sufficient rigidity cannot achieved; meanwhile, if it exceeds 20 $\mu$m, paper running in the electrophotographic apparatus deteriorates because of excessively high rigidity. A thickness of 2 to 20 $\mu$m is preferable to attain further stable rigidity.

In addition, fine powder of amorphous silicon dioxide (silica) may be added to the backing layer 13. By mixing 2 to 5 parts by weight of silica fine powder, which preferably has a particle size of from 0.5 to 10 $\mu$m, the stability of the layer is improved.

Figure 2:
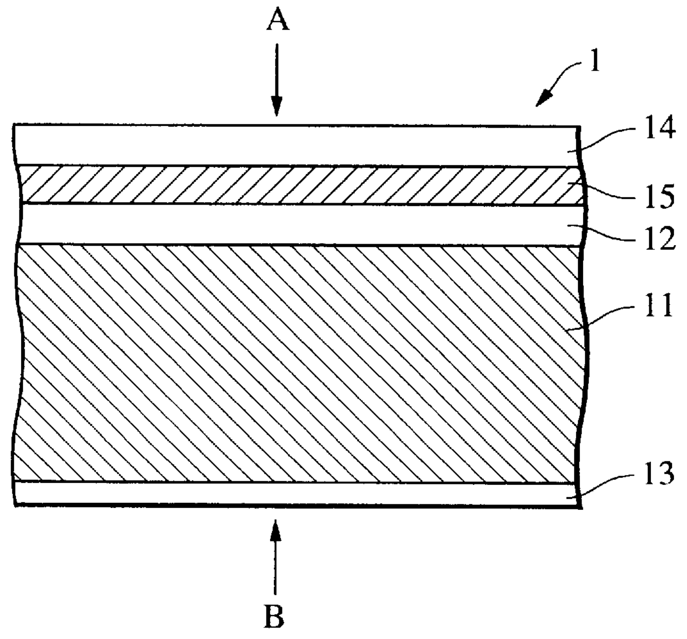
FIG. 2 is a diagrammatic sectional view showing another decalcomania transfer medium of the present invention.
Figure 3:
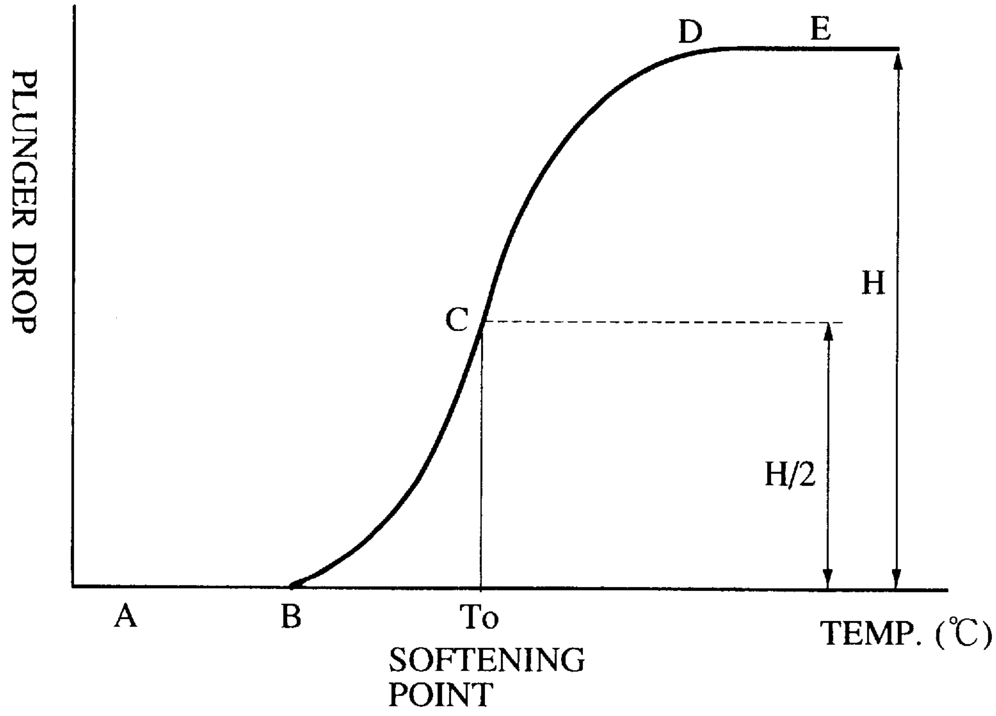
FIG. 3 shows the melt characteristics of toner used for a decalcomania transfer medium of the present invention.

FIG. 2 shows an example of another decalcomania transfer medium according to the present invention, which has the same structure as the decalcomania transfer medium shown in FIG. 1, except that a separating layer 15 is provided between a transfer layer 14 and an adhesion layer 12. The separating layer 15 is used as a primer layer of the transfer layer 14 and required to exhibit sufficient peeling properties at the interface with the adhesion layer 12. The thickness of the separating layer 15 is preferably from 2 to 6 $\mu$m, both including. If the thickness exceeds 6 $\mu$m, curling readily occurs because of an increase in the shrinkage caused by the moisture of the layer. Meanwhile, when it is less than 2 $\mu$m, uniform coating is not readily achieved.

An example of the preferable composition for the separating layer 15 is a polyvinyl alcohol obtained by saponifying polyvinyl acetate, which saponification is 95% or more, and, more preferably, 98% or more. In addition, when a polyvinyl alcohol of which polyvinyl acetate is 90% or less saponified is used, a small amount of a water-soluble silicone compound (generally, an active surface agent, such as an antifroth agent), as a parting agent, may be added. A polyvinyl alcohol of which polyvinyl acetate is 70% or less saponified is hardly used because of the insufficient water proofing properties thereof. However, if the foregoing silicone compound is mixed therein, the same composition as the transfer layer 14 can be applied to the separating layer 15 without complication.

In addition, when selecting materials for the separating layer 15 and the adhesion layer 12, it is necessary to consider the adhesive strength therebetween, which is evaluated as a strength required for peeling a retransfer film layer, composed of the transfer layer 14 and the separating layer 15, in the direction of 90° to the base material 11 fixed on a flat plate with adhesive means, such as an adhesive tape having adhesive coating on both surfaces thereof. The adhesive strength is preferably 6 g/cm or less to prevent the retransfer layer from tearing when the layer is peeled from the base material 11, and preferably 1.5 g/cm or more to avoid peeling due to a carriage force in the electrophotographic apparatus.

Next, toner for electrophotography applicable to a decalcomania transfer medium of the present invention will be explained in detail as follows: Basically, toner prepared by adding a pigment, such as carbon black, yellow, cyan and magenta, to a binder resin essentially consisting of a material including styrene-acrylate copolymer, styrene-butadiene copolymer, epoxy resin and polyester resin, can be used. Among these, the color toner explained below is particularly suitable for achieving the advantages of a decalcomania transfer medium of the present invention.

Toner used for a color electrophotographic apparatus is required to have excellent characteristics in melting and color mixing when heat is applied thereto and, further, to exhibit a low softening point and the sharp melt characteristics, i.e., a short melting time.

By employing toner with the sharp melt characteristics, the color reproducibility range of an object becomes wider, resulting in an image faithful to the full-color original.

To produce such toner having the sharp melt characteristics, a binding resin, such as a polyester resin and a styrene-acrylic resin, a coloring agent, such as a pigment or a sublimating pigment, a charging controlling agent and the like are dissolved and mixed together, followed by pulverization and classification. A process of adding a various kinds of additives may be employed if required.

Considering the fixation and sharp melt characteristics, in particularly, a polyester resin is preferably used as the binder resin for color toner. The polyester resin having the sharp melt characteristics has ester bonds at the principal chain of the molecular thereof obtained by synthesizing a diol compound and a dicarboxylic acid compound. Particularly, a polyester resin having the following structure is preferable because of its sharp melt characteristics: The diol compound and the dicarboxylic acid compound thereof are copolycondensed; the diol component thereof is a bisphenol derivative having the following formula I or a substituted compound thereof, Formula I

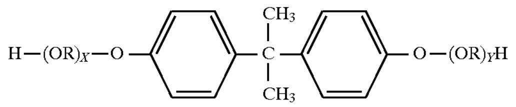

wherein R is an ethylene or propylene group, x and y are independently integers of at least 1, and the average value of x +y is from 2 to 10; and the carboxylic acid component thereof is a di- or higher carboxylic acid, an acid anhydride thereof, a lower alkyl ester thereof or the like. Examples of the preferable carboxylic acid component are fumaric acid, maleic acid, maleic acid anhydride, phthalic acid, terephthalic acid, trimellitic acid and pyromellitic acid.

The softening point of the polyester resin having the sharp melt characteristics is preferably in a range of from 60° to 120° C. FIG. 2 shows the softening characteristic of the toner containing this type of a polyester resin as a binder resin.

A plunger drop-temperature curve, hereinafter referred to as a softening sigmoid curve, is estimated by a Flow Tester CFT-500 (made by Shimazu Seisakusho K. K.) equipped with a die (nozzle) having a diameter of 0.5 mm and a thickness of 1.0 mm. After preheating for 300 seconds at an initial setting temperature of 80° C., measurement is carried out under a load of 50 kg while rising the temperature at a constant rate of 5° C./min. One to three g of finely powdered toner is accurately weighed out. In this measurement, the cross section of the plunger is 10 $cm^2$. The softening sigmoid curve shown in FIG. 2 is obtained. After heating is initiated, the toner is gradually heated corresponding to the constant temperature rising and it starts melting and flowing, which is illustrated as the points A to B of the softening sigmoid curve in FIG. 2. The melted toner largely flows due to further heating, which is illustrated as the points B to C to D and, finally, the plunger drop is stopped, which is illustrated as the points D to E.

The height H of the softening sigmoid curve means the total flow and the temperature To at the point C corresponding to a half of the H value indicates the softening point of the toner.

In the present invention, toner having the sharp melt characteristics means satisfying the following formulae:

$T_1$=90° to 150° C.; and $|\Delta T|=|T_1-T_2|$=5° to 30° C.

wherein $T_1$ and $T_2$ are the temperatures when the melting viscosity is $10^5$ cp and $5\times10^4$ cp, respectively.

The toner having the foregoing temperature-sharp melt characteristics exhibits a significantly sharp decrease in viscosity due to heating. Excellent subtractive color mixing is thereby achieved because mixing between the top and bottom layers is appropriately proceeded at the fixation process and the transparency of the toner layer itself is rapidly increased due to the decrease in viscosity.

Practical examples of the present invention will be described below. The terms "part" used in those examples represent a part by weight.

EXAMPLE 1

As base paper, so-called coated paper was prepared such that both sides of wood-free paper weighing 80 g/$m^2$ was coated with a coating liquid, composed of starch and calcium carbonate, for filling. A transfer medium A was obtained as follows:

<Adhesion layer and Backing layer>

Using a screen coater, an adhesion layer and a backing layer were formed respectively at 6 g/$m^2$ (6 $\mu$m thick) and 4 g/$m^2$ (4 $\mu$m thick) by coating a coating liquid having the following composition:

- acrylic resin (trade name: Cover-Coat Resin LO-316, manufactured by Goo Chemical Co., Ltd.) 100 parts
- toluene 100 parts <Transfer layer>

Using a screen coater, a transfer layer of 16 $\mu$m thick was formed on the adhesion layer by coating a coating liquid having the following composition:

- low saponified polyvinyl alcohol (saponification of 88%, trade name: Kasezole 05, manufactured by Nicca Chemical Co., Ltd.) having a solid content of 14%, 50 parts
- high saponified polyvinyl alcohol (trade name: Kuraray Vopal PVA110, manufactured by Kuraray Co., Ltd.) 50 parts
- water 5 parts
- antistatic agent (trade name: Cation AB, manufactured by NOF Corporation) 2.5 parts
- silicone antifroth agent (trade name: KM73, manufactured by Shin-Etsu Chemical Co., Ltd.) 4 parts The adhesion strength between the transfer layer and the adhesion layer of the transfer medium A was 2 g/cm, and the surface resistivity of the transfer layer was $10^{11}$ Ω/□.

The resultant transfer medium A was subjected to color image copying by a CLC700 color copying machine (manufactured by Canon Inc.). An excellent color image was obtained without peeling of the coating film. Then, the transfer medium A was left at 23° C. and at a low humidity of 5% for 5 min. while keeping the transfer layer facing up. As a result, the edge of the transfer medium A curled and lifted approximately 5 mm; however, the paper running of the color copying machine was not impaired by using the curled transfer medium A.

The transfer layer having the toner image thereon was peeled from the transfer medium A; allowed to be in close contact with coated board paper such that the correct toner image was put thereon; heated to 110° C.; and pressed. Then, an 80% ethyl alcohol aqueous solution was applied to the transfer layer from the back side thereof. The polyvinyl alcohol film thereby expanded without dissolving, and separated the toner image therefrom to complete the decalcomania.

COMPARATIVE EXAMPLE 1

A transfer medium B was prepared according to the same method as example 1, except that the backing layer was omitted.

After leaving the resulting transfer medium B at 23° C. and 5% humidity for 5 min. while keeping the transfer layer facing up, the edge of the transfer medium B lifted approximately 20 mm. A paper running test performed similarly to example 1 using the CLC 700 copying machine revealed paper jamming due to obstruction of the electrostatic absorption to a transfer drum caused by exceedingly large curling.

EXAMPLE 2

As base paper, so-called coated paper (weighing 127 g/$m^2$) was prepared such that both sides of wood-free paper weighing 104 g/$m^2$ was coated with a coating liquid, composed of styrene-butadiene rubber, starch, kaolin, and calcium carbonate, for filling. A transfer medium C was obtained as follows:

<Adhesion layer and Backing layer>

Using a screen coater, an adhesion layer and a backing layer were formed respectively at 4 g/$m^2$ (4 $\mu$m thick) and 2 g/$m^2$ (2 $\mu$m thick) by coating a coating liquid having the following composition:

- acrylic resin (trade name: Cover-Coat Resin LO-316, manufactured by Goo Chemical Co., Ltd.) 100 parts
- toluene 100 parts <Transfer layer>

Using a screen coater, a transfer layer of 16 $\mu$m thick was formed on the adhesion layer by coating a coating liquid having the following composition:

- low saponified polyvinyl alcohol (saponification of 88%, trade name: Kasezole 05, manufactured by Nicca Chemical Co., Ltd.) having a solid content of 14%, 75 parts
- high saponified polyvinyl alcohol (trade name: Kuraray Vopal PVA110) having a solid content of 14%, 25 parts
- water 5 parts
- antistatic agent (trade name: Cation AB, manufactured by NOF Corporation) 2.5 parts
- silicone antifroth agent (trade name: KM73, manufactured by Shin-Etsu Chemical Co., Ltd.) 4 parts The adhesion strength between the transfer layer and the adhesion layer of the resultant transfer medium C was 3 g/cm, and the surface resistivity of the transfer layer was $10^{11}$ Ω/□.

The resultant transfer medium C was subjected to color image copying by the CLC700 color copying machine (manufactured by Canon Inc.). An excellent color image was obtained without peeling of the coating film. Then, the transfer medium C was left at 23° C. and at a low humidity of 5% for 5 min. while keeping the transfer layer facing up. As a result, the edge of the transfer medium C curled and lifted approximately 3 mm; however, the paper running of the color copying machine was not impaired by using the curled transfer medium C.

The transfer layer having the toner image thereon was peeled from the transfer medium C; allowed to be in close contact with coated board paper such that the correct toner image was put thereon; heated to 110° C.; and pressed. Then, an 80% ethyl alcohol solution was applied to the transfer layer from the back side thereof. The polyvinyl alcohol film thereby expanded without dissolving and separated the toner image therefrom to complete the decalcomania. However, the polyvinyl alcohol film of the transfer layer dissolved to some extent at portions to which a large amount of the aqueous ethyl alcohol solution was applied.

COMPARATIVE EXAMPLE 2

A transfer medium D was prepared according to the same method as example 2, except that all of the polyvinyl alcohol used for the transfer layer was composed of low saponified polyvinyl acetate.

After leaving the resultant transfer medium D at 23° C. and 5% humidity for 5 min. while keeping the transfer layer facing up, the edge of the transfer medium lifted approximately 15 mm. The paper running test performed similarly to example 1 using the CLC 700 copying machine revealed paper jamming due to obstruction of the electrostatic absorption to a transfer drum caused by exceedingly large curling.

In addition, the polyvinyl alcohol contained in the surface layer started softening, after leaving the transfer medium D at 30° C. and a humidity of 80% for approximately 1 week.

EXAMPLE 3

A transfer medium E was prepared according to the same method as example 1, except that the backing layer having a thickness of 15 μm was formed from an epoxy resin.

Similarly to example 1, the resultant transfer medium E was subjected to color image copying by the CLC700 color copying machine, resulting in an excellent color image and the paper running characteristics. However, the rigidity of the transfer medium E was so high that the medium nearly touched to a paper-carriage guide and bounded during paper carriage.

EXAMPLE 4

As base paper, so-called coated paper was prepared such that both sides of wood-free paper weighing 80 g/m$^2$ was coated with a coating liquid, composed of starch and calcium carbonate, for filling. A transfer medium F was obtained as follows:

<Adhesion layer>

Using a screen coater, an adhesion layer having a thickness of 9 μm was formed at 10 g/m$^2$ by coating a coating liquid having the following composition:

acrylic resin (trade name: Cover-Coat Resin LO-316) 100 parts toluene 100 parts silica (trade name: FPS-3, manufactured by Shionogi & Co., Ltd.) 4 parts <Separating layer>

Using a screen coater, a separating layer of 4 μm thick was formed on the adhesion layer by coating a coating liquid having the following composition:

high saponified polyvinyl alcohol (saponification of 99%, trade name: Kuraray Vopal PVA110) aqueous solution having a solid content of 14%, 20 parts water 100 parts <Transfer layer>

Using a screen coater, a transfer layer of 7 μm thick was formed on the separating layer by coating a coating liquid having the following composition:

high saponified polyvinyl alcohol (saponification of 99%, trade name: Kuraray Vopal PVA110) aqueous solution having a solid content of 14%, 50 parts low saponified polyvinyl alcohol (saponification of 88%, trade name: Kasezole 0-5) aqueous solution having a solid content of 14%, 50 parts antistatic agent (trade name: Cation AB) 2.5 parts silica (trade name: FPS-2, manufactured by Shionogi & Co., Ltd.) 6 parts water 5 parts <Backing layer>

Using a screen coater and a 70% (opening rate of 30%) screen press plate, a backing layer having a thickness of 4 μm was formed at 6 g/m$^2$ on one side of the base paper opposite to the transfer layer by coating a coating liquid having the following composition:

acrylic resin (trade name: Plus-Size LO-170, manufactured by Goo Chemical Co., Ltd.) 100 parts toluene 100 parts silica (trade name: FPS-3) 4 parts The covering rate of the coated layer was 75% and the area of each opening was 0.36 mm$^2$.

The adhesion strength between the adhesion layer and the separating layer of the resultant transfer medium F was 2 g/cm, and the surface resistivity of the transfer layer was $10^{11}$ Ω/□.

The resultant transfer medium F was subjected to continuous color image copying by the CLC700 color copying machine (manufactured by Canon Inc.). An excellent color image was obtained without peeling of the coating film. Then, the transfer medium F was left at 23° C. and at a humidity of 5% for 5 min. while keeping the transfer layer facing up. As a result, the edge of the transfer medium C curled and lifted 5 mm on average; however, the paper running of the color copying machine was not impaired by using the curled transfer medium F.

Further, the integrated film, composed of the transfer layer having the toner image thereon and the separating layer, was peeled from the transfer medium F; allowed to be in contact with coated board paper such that the correct toner image was put thereon; and pressed by an iron heated to 110° C. Then, an 80% ethyl alcohol aqueous solution was applied to the transfer layer from the separating layer. The polyvinyl alcohol film thereby expanded without dissolving and separated the toner image therefrom to complete the decalcomania.

In addition, when a transfer medium the back layer of which had a covering rate of 94% was prepared according to this example, remarkable blisters were not observed at heat-fused portions. However, when copying continuously proceeded, metallic portions of the heat fuser was heated, and a potion of the transfer medium being in contact therewith formed small blisters, indicating the shortage of the opening area.

EXAMPLE 5

A transfer medium G was prepared according to the same method as example 1, except that the coverage rate of the backing layer was 25% and the coating amount thereof was 8 $g/m^2$.

Also in this example, excellent results were obtained from similar tests to example 4, for example, the average curling at a low humidity was as small as 6 mm because of the low coverage rate and the high coating amount.

In addition, another transfer medium of this example was prepared such that the coverage rate of the backing layer was 15% and the coating amount was 20 $g/m^2$ (21 $\mu$m thick), and subjected to similar tests to example 4. As a result, wrinkles occurred over the whole transfer medium because of the exceedingly low covering rate, and paper running became impossible at a low humidity.

EXAMPLE 6

As base paper, so-called coated paper was prepared such that both sides of wood-free paper weighing 80 $g/m^2$ was coated with a coating liquid, composed of starch and calcium carbonate, for filling. A transfer medium H was obtained as follows:

<Adhesion layer>

Using a screen coater, an adhesion layer having a thickness of 9 $\mu$m was formed at 10 $g/m^2$ by coating a coating liquid having the following composition:

acrylic resin (trade name: Cover-Coat Resin LO-316, manufactured by Goo Chemical Co., Ltd.) 100 parts toluene 100 parts silica (trade name: FPS-3, manufactured by Shionogi & Co., Ltd.) 4 parts <Transfer layer>

Using a screen coater, a transfer layer was formed to be 12 $\mu$m thick on the adhesion layer by coating a coating liquid having the following composition:

high saponified polyvinyl alcohol (saponification of 99%, trade name: Kuraray Vopal PVA110) aqueous solution having a solid content of 14%, 50 parts low saponified polyvinyl alcohol (saponification of 88%, trade name: Kasezole 0-5 aqueous solution) aqueous solution having a solid content of 14%, 50 parts antistatic agent (trade name: Cation AB, manufactured by NOF Corporation) 2.5 parts silica (trade name: FPS-2, manufactured by Shionogi & Co., Ltd.) 6 parts silicone (trade name: KM73, manufactured by Shin-Etsu Chemical Co., Ltd.) 4 parts water 5 parts <Backing layer>

Using a screen coater and an 80% screen press plate, a backing layer having a thickness of 5 $\mu$m was formed at 7 $g/m^2$ on one side of the base paper opposite to the transfer layer by coating a coating liquid having the following composition:

acrylic resin (trade name: Plus-Size LO-170, Goo Chemical Co., Ltd.) 100 parts toluene 100 parts silica (trade name: FPS-3, manufactured by Shionogi & Co., Ltd.) 4 parts The covering rate of the coated layer was 82% and the area of each opening was 0.25 $mm^2$.

The adhesion strength between the adhesion layer and the transfer layer of the resultant transfer medium H was 3 g/cm, and the surface resistivity of the transfer layer was $10^{11}$ $\Omega/\square$.

The resultant transfer medium H was subjected to continuous color image copying by the CLC700 color copying machine (manufactured by Canon Inc.). An excellent color image was obtained without peeling of the coating film. Then, the transfer medium H was left at 23° C. and at a humidity of 5% for 5 min. while keeping the transfer layer facing up. As a result, the edge of the transfer medium H curled and lifted 3 mm on average; however, the paper running of the color copying machine was not impaired by using the curled transfer medium H.

The transfer layer having the toner image thereon was peeled from the transfer medium H; allowed to be in contact with coated board paper such that the correct toner image was put thereon; and pressed by an iron heated to 110° C. Then, an 80% ethyl alcohol aqueous solution was applied to the transfer layer from the back side. The polyvinyl alcohol film thereby expanded without dissolving and separated the toner image therefrom to complete the decalcomania to the coated board paper.

What is claimed is:

1. An electrophotographic decalcomania transfer medium comprising a polymer resin film formed on the first side of a base material consisting essentially of paper, wherein said polymer resin film on the first side comprises an adhesion layer and a transfer layer, and the second side of said base material is provided with a backing layer covering at least a portion of said second side, said backing layer comprising a polymer resin.

2. An electrophotographic decalcomania transfer medium as set forth in claim 1, wherein said polymer resin film can be separated by peeling at an interface between said adhesion layer and said transfer layer.

3. An electrophotographic decalcomania transfer medium as set forth in claim 1, wherein the adhesion strength between said adhesion layer and said transfer layer is from 1.5 to 4 g/cm.

4. An electrophotographic decalcomania transfer medium as set forth in claim 1, wherein an separating layer is provided between said adhesion layer and said transfer layer.

5. An electrophotographic decalcomania transfer medium as set forth in claim 4, wherein said polymer resin film can be separated by peeling at an interface between said separating layer and said adhesion layer.

6. An electrophotographic decalcomania transfer medium as set forth in claim 5, wherein the adhesion strength between said separating layer and said adhesion layer is from 1.5 to 6 g/cm.

7. An electrophotographic decalcomania transfer medium as set forth in claim 1, wherein 20 to 90% of the surface of said base material is covered with said backing layer.

8. An electrophotographic decalcomania transfer medium as set forth in claim 7, wherein said backing layer comprises a plurality of regularly shaped islands on the surface of said base material.

9. An electrophotographic decalcomania transfer medium as set forth in claim 1, wherein said adhesion layer and said backing layer comprises a resin selected from the group consisting of acrylic, polyester and nylon resins.

10. An electrophotographic decalcomania transfer medium as set forth in claim 1, wherein said transfer layer comprises a water-soluble polymer.

11. An electrophotographic decalcomania transfer medium as set forth in claim 10, wherein said transfer layer comprises a polyvinyl alcohol.

12. An electrophotographic decalcomania transfer medium as set forth in claim 11, wherein said transfer layer comprises a polyvinyl alcohol containing an organic silicone compound.

13. An electrophotographic decalcomania transfer medium as set forth in claim 10, wherein said transfer layer comprises a polyvinyl alcohol obtained by saponifying 95% or more of polyvinyl acetate and a polyvinyl alcohol obtained by saponifying 90% or less of polyvinyl acetate, and the solid content of said polyvinyl alcohol of which polyvinyl acetate is 95% or more saponified is from 25% or more to less than 75% by weight.

14. An electrophotographic decalcomania transfer medium as set forth in claim 1, wherein said transfer layer has a surface resistivity of $10^8$ to $10^{12}$ Ω/□ at 20° C. and 65% RH.

15. An electrophotographic decalcomania transfer medium as set forth in claim 1, wherein said adhesion layer contains fine powder of silicon dioxide.

16. An electrophotographic decalcomania transfer medium as set forth in claim 1, wherein said transfer layer contains fine powder of silicon dioxide.

17. An electrophotographic decalcomania transfer medium as set forth in claim 1, wherein said backing layer contains fine powder of silicon dioxide.

* * * * *